United States Patent [19]

Mielke et al.

[11] Patent Number: 4,987,866

[45] Date of Patent: Jan. 29, 1991

[54] LIGHT ALLOY PISTON FOR INTERNAL COMBUSTION ENGINES

[75] Inventors: Siegfried Mielke, Neckarsulm; Wilfried Weber, Hamburg; Werner Steidle, Friedrichshall, all of Fed. Rep. of Germany

[73] Assignee: Kolbenschmidt Aktiengesellschaft, Neckarsulm, Fed. Rep. of Germany

[21] Appl. No.: 495,812

[22] Filed: Mar. 16, 1990

[30] Foreign Application Priority Data

Mar. 17, 1989 [DE] Fed. Rep. of Germany ....... 3908810

[51] Int. Cl.5 ............................ F02F 3/00; F02F 3/26; C22C 21/00
[52] U.S. Cl. .................................. 123/193 P; 92/234; 92/235; 92/236
[58] Field of Search ............... 123/193 P; 92/234, 235, 92/236

[56] References Cited

U.S. PATENT DOCUMENTS

| 1,707,748 | 4/1929 | Wood | 92/234 |
| 1,769,835 | 7/1930 | Hater | 92/236 |
| 2,186,375 | 1/1940 | Flammang | 92/236 |
| 4,890,543 | 1/1990 | Kudou et al. | 123/193 P |

Primary Examiner—Andrew M. Dolinar
Assistant Examiner—M. Macy
Attorney, Agent, or Firm—Sprung Horn Kramer & Woods

[57] ABSTRACT

A light-alloy piston for internal combustion engine, is formed in the piston head with a combustion chamber recess. The stresses which are induced at the rim of the combustion chamber recess by the ignition pressure are reduced by the provision of an inwardly extending blind hole in the portions between the ring groove for the lowermost compression ring and the top apex of the bores in the piston pin bosses.

14 Claims, 3 Drawing Sheets

LIGHT ALLOY PISTON FOR INTERNAL COMBUSTION ENGINES

BACKGROUND OF THE INVENTION

This invention relates to a light alloy piston for internal combustion engines, which piston comprises a top portion including a piston head formed with a combustion chamber recess and the ring groove portion and also comprises a skirt with integrated piston pin bosses which are provided with a block support or trapezoidal support.

Under the mechanical loads which are due to the ignition pressure, the head of light-alloy pistons for internal combustion engines is subjected to such a deformation in operation that under the load applied that the head arches upwardly over the piston pin bosses line a beam which is supported only in a small width and the ring grooves are arched too. Whereas the light-alloy piston can be designed to resist deformation so that its deformation will be keep within controllable limits, a support of the piston head for a proper transmission of force can be provided by piston pin bosses having various configurations, each of which will be optimum from the aspect of weight under certain boundary conditions. For a high ignition pressure loading, a block support for the piston pin bosses is preferred; in that case the piston pin bosses are straight on the inside and merge into the piston head without an undercut. A trapezoidal support is a modified block support and is used for very highly loaded pistons, particularly diesel pistons: in that case the piston pin bosses are beveled on the inside under an angle of inclination of 8 to 15 degrees and a correspondingly beveled connecting rod is employed. Owing to the partial overlap of the bearing surfaces a trapezoidal support will reduce the bending stress in the piston head and in the piston pin so that the permissible load will be increased by up to 15%. Even if the support for the piston pin bosses, i.e., the zone between the top apex of the bores in the piston pin bosses and the piston head, is designed to withstand high loads a maximum ignition pressure of 150 to 170 bars will subject those portions of the rim of the combustion chamber recess which are subjected to the highest loading by the ignition pressure to a loading which exceeds to the highest loading of about 30 N/mm$^2$ which is permissible in a cast light-alloy piston having conventionally designed piston pin bosses. Besides, a conical flaring of that portion of the bores in the piston pin bosses which is adjacent to the connecting rod, or a necking of the piston in the vertical plane which contains those ends of the piston pin bosses which are adjacent to the connecting rod, or a provision of lateral recesses, so-called oil pockets, in the bearing surfaces of the bores in the piston pin bosses, will result in an increase of the stresses in those portions of the combustion chamber recess which are subjected to the highest loading by the ignition pressure.

SUMMARY OF THE INVENTION

It is an object to permit higher loads to be taken up by stresses without a change of the material and to avoid a restriction which is due to a higher loading at the rim of the combustion chamber recess owing to the provision of flared bores in the piston pin bosses or a necking at the piston pin or the provision of oil pockets in the bearing surfaces of the bores in the piston pin bosses. To that end the invention resides in that a blind hole is formed in the portions disposed between the ring groove for the lowermost compression ring and the top apex of the bores in the piston pin bosses and extends from the outside peripheral surface of the skirt inwardly on both sides of the plane which contains the piston axis and the direction of the piston pin axis. Owing to the presence of such blind hole in the force being transmitted will be deflected to the direction of the width, i.e, into the portions on the left and right of the blind holes, so that the mechanical stresses at the rim of the combustion chamber recess will be reduced and the stresses adjacent to the ring grooves will be compensated as the piston head is supported in a larger width over the piston pin bosses.

In most cases the blind hole will be disposed in the portion between the ring groove for the oil scraper ring and the top apex of the bores in the piston pin bosses.

In accordance with a further feature of the invention the blind hole is circular in cross-section and has a diameter that is 10 to 150%, preferably 10 to 75%, of the diameter of the bores in the piston pin bosses.

In a preferred embodiment of the invention the blind hole has a cross-section the configuration of a slot which has a largest diameter that is parallel to the horizontal plane which includes the direction of the piston pin axis and said largest diameter has a length of 30 to 150%, preferably 50 to 120%, of the diameter of the bores in the piston pin bosses and the smallest diameter of the slot-shaped blind hole is larger than three times the height of the ring groove for the oil scraper ring.

The slot-shaped cross-section of the blind hole has suitably the configuration of an ellipse or an elongated hole.

A particularly favorable stress distribution will be obtained if the elongated hole consists of two isosceles legs, which include an obtuse angle on the side facing the skirt, and the largest diameter of each of said sections includes an angle of 5° to 25° with the plane that is at right angles to the plane which contains the piston axis and the direction of the piston pin axis.

In a modification of the invention, a plurality of parallel cylindrical blind holes are formed in the portions between the ring groove for the lowermost compression ring and the top apex of the bores in the piston pin bosses and extend inwardly from the outside peripheral surface of the piston skirt and have a common envelope having the configuration of a slot. In dependence on the magnitude of the mechanical loading of the edge of the combustion chamber recess, the blind hole or holes extends or extend throughout the middle portion of that length portion of the bores in the piston pin bosses in which the piston pin is supported in said bores.

As a rule the blind hole or holes is or are symmetrical to the plane which contains the piston axis and the direction of the piston pin axis and at right angles to the plane which contains the piston axis and the direction that is at right angles to the direction of the piston pin axis.

In order to provide optimum lubricating conditions between the piston pin and the bearing surfaces of the bores in the piston pin bosses, the blind hole or holes communicates or communicate through an aperture with the bores in the piston pin bosses in those portions which are opposite to the top apex of said bores in the piston pin bosses.

The invention is shown by way of example in the drawings and will be explained hereinafter.

DETAILED DESCRIPTION OF THE INVENTION

Figure 2:
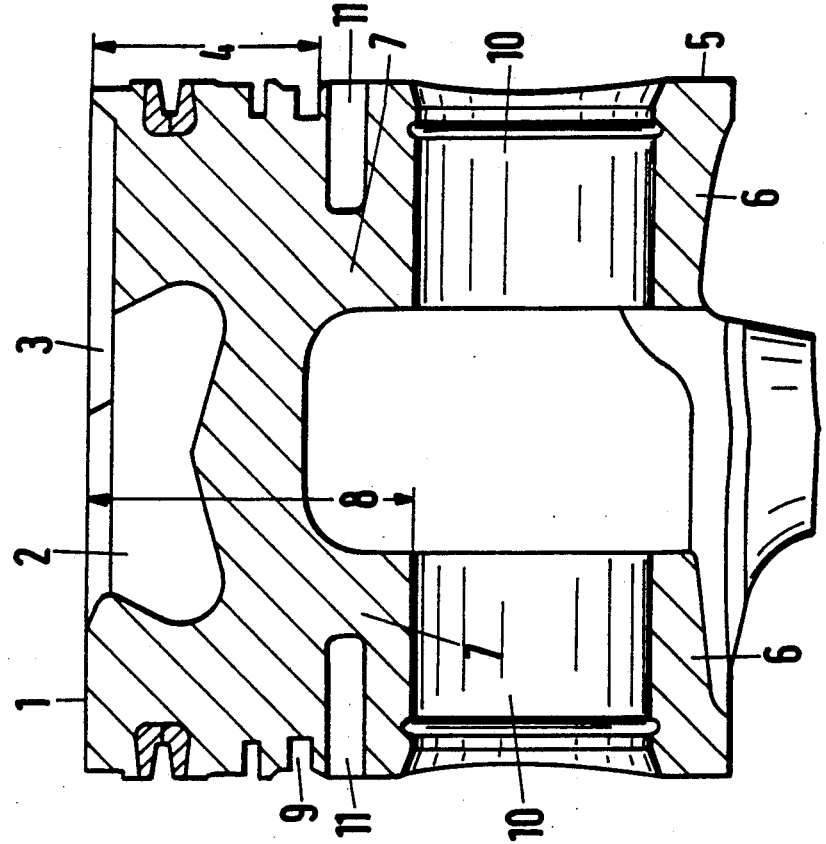
FIG. 2 is a longitudinal sectional view taken along line II—II in FIG. 1.
Figure 1:
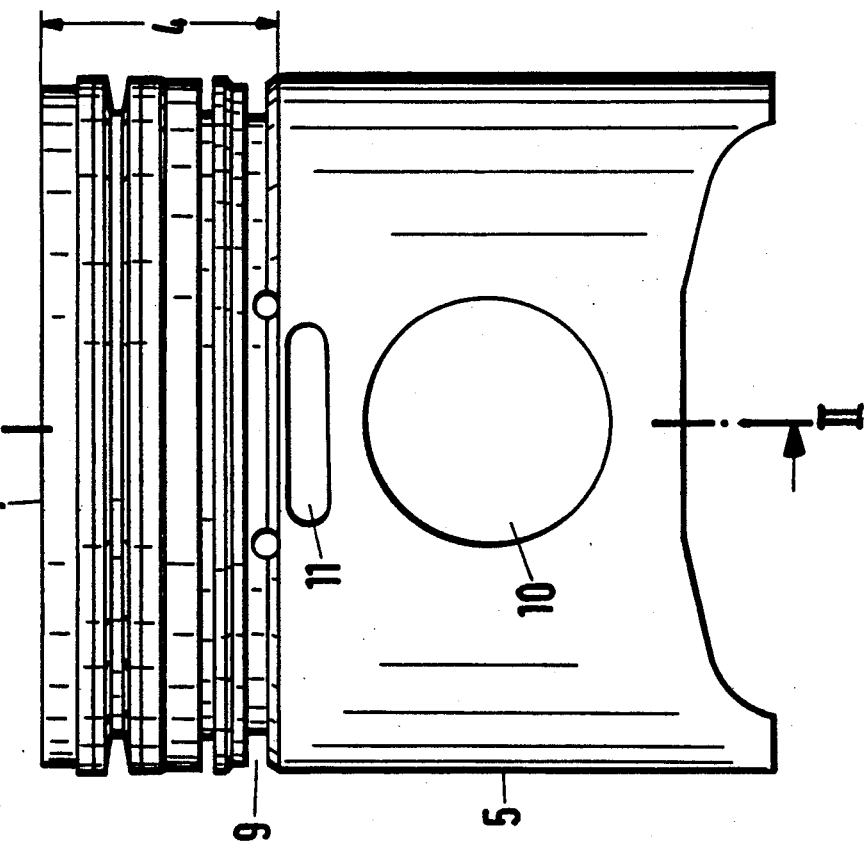
FIG. 1 is a side elevation view of a piston according to the invention.

A cast piston made of a piston aluminum alloy of the type AlSi12CuNiMg is shown in FIG. 1 in a side elevation viewed in the direction of the piston pin axis and in FIG. 2 in a longitudinal sectional view taken on the section line II—II in FIG. 1. The piston comprises a top portion that includes the piston head 12 formed with the combustion chamber recess 2 and a valve pocket 3 and also includes the ring groove portion 4. The piston also comprises a skirt 5, which is integrally formed with piston pin bosses 6, which are provided with a block support having a height 8 amounting to 50% of the piston diameter. A blind hole 11 having in cross-section the configuration of an elongate hole is provided in the portion extending between the ring groove 9 for the oil scraper ring and the top apex of the bores 10 in the piston pin bosses 6 and extends radially inwardly from the outside peripheral surface of the skirt 5 approximately to the center of that length portion of the piston pin bosses 6 in which the piston pin is supported in said bosses. The blind hole 11 is symmetrical to the plane which contains the piston axis and the direction of the piston pin axis and extends at right angles to the plane which contains the piston axis and the direction that is at right angles to the direction of the piston pin axis.

Figure 4:
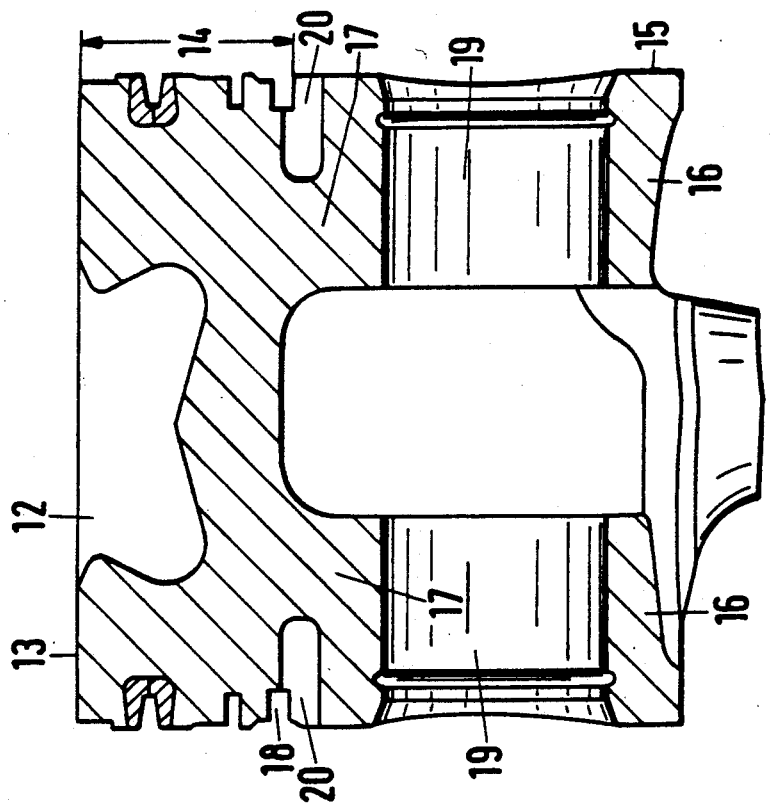
FIG. 4 is a longitudinal sectional view taken along line IV—IV in FIG. 3.
Figure 3:
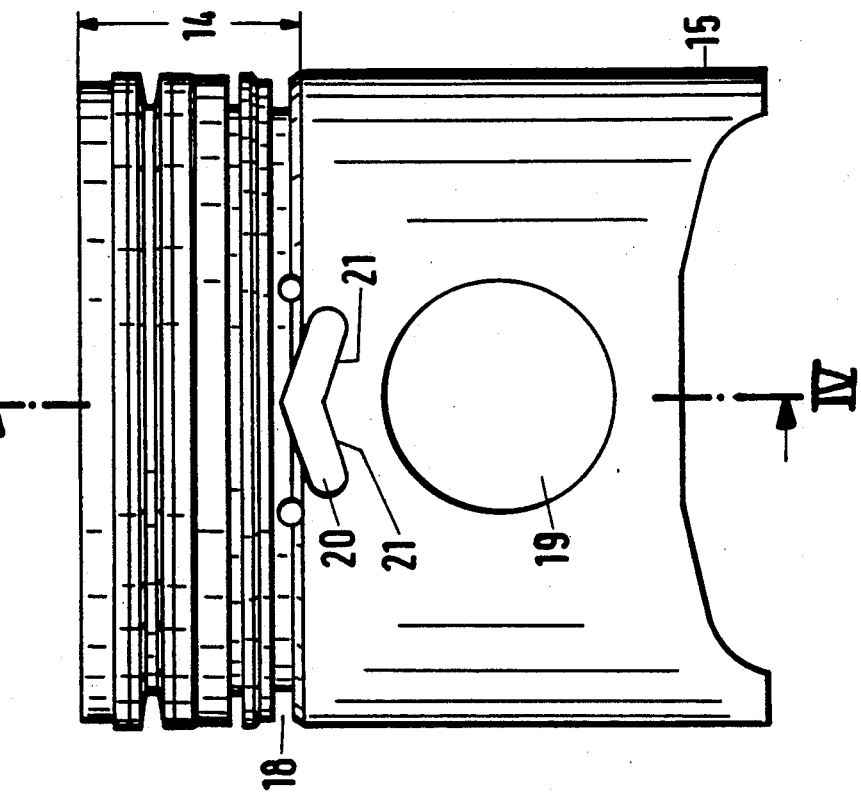
FIG. 3 is a side elevation view of another piston according to the invention.

A cast piston made of a piston aluminum alloy is shown in FIG. 3 in a side elevation viewed in the direction of the piston pin axis and in FIG. 4 in a longitudinal sectional view taken on section line IV—IV and comprises a piston head 13 formed with a combustion chamber recess 12. The top portion of the piston comprises the ring groove portion 14 and the skirt 15 is integrally formed with piston pin bosses 16, which are provided with a block support 17. A blind hole 20 is provided between the level of the top side face of the ring groove 18 for the oil scraper ring and the top apex of the bores 19 in the piston pin bosses and extends radially inwardly from the outside peripheral surface of the skirt 15 and has in cross-section the configuration of an elongate hole having two legs 21, which on the side facing the skirt include an obtuse angle. Said legs are symmetrical to the plane which contains the piston axis and the direction of the piston pin axis and have a largest diameter which includes an angle of 17° with the horizontal plane that is at right angles to the first mentioned plane.

Figures 5, 6, 7:
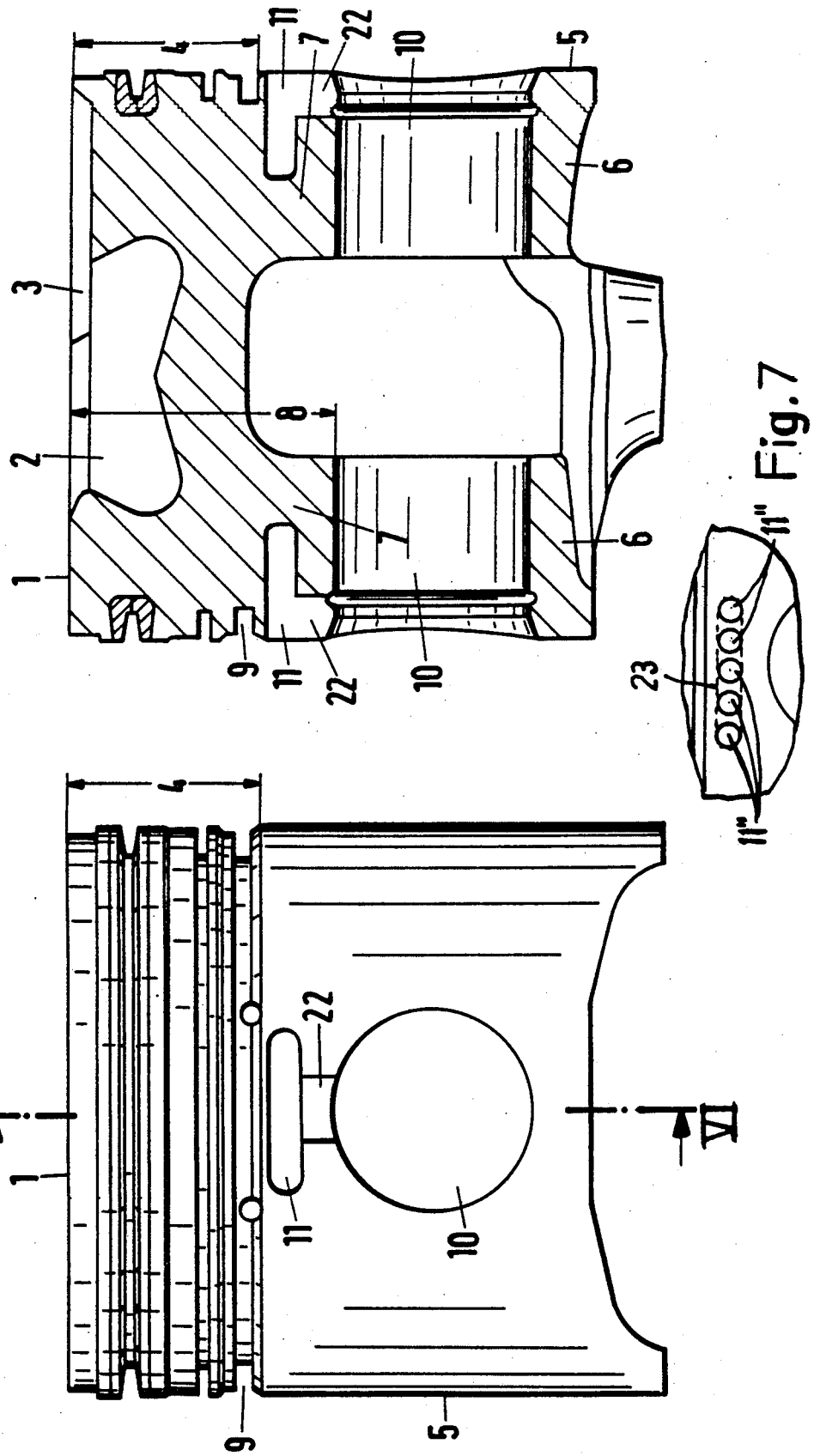
FIG. 5 is a side elevation view of a further piston according to the invention.
FIG. 6 is a longitudinal sectional view taken along line VI—VI in FIG. 5.
FIG. 7 is a partial side elevation view of another embodiment according to the invention.

FIGS. 5 and 6 are similar to FIGS. 1 and 2 and show a piston which differs from that shown in FIGS. 1 and 2 in that the forward portion of the blind hole 11' communicates with the bores 10' through an aperture 22, which opens in the top apex of the bores 10 in the piston pin bosses 6.

In a modification of the invention, as shown in FIG. 7, a plurality of parallel cylindrical blind holes 11" are formed in the portions between the ring groove for the lowermost compression ring and the top apex of the bores in the piston pin bosses and extend inwardly from the outside peripheral surface of the piston skirt and have a common envelope 23 having the configuration of a slot. In dependence on the magnitude of the mechanical loading of the edge of the combustion chamber recess, the blind hole or holes extends or extend throughout the middle portion of that length portion of the bores in the piston pin bosses in which the piston pion is supported in said bores.

In the following Table, the results have been compiled which have been obtained by stress measurements taken on the inside of the block support and at the rim of the combustion chamber recess adjacent to the valve pocket in a direction which is parallel to the direction of the piston pin axis, and at the rim of the combustion chamber recess outside the valve pocket in directions are respectively parallel and at right angles to the piston pin axis, in a light-alloy piston (II) in accordance with the invention and in a conventional light alloy piston (I). Supplementary stress measurements were taken at the same locations in a light-alloy piston (III) which was designed in accordance with the invention and in which the rim of the combustion chamber recess was reinforced by a structure composed of $Al_2O_3$ fibers. Upon a comparison of the results of measurements it is clearly apparent that in the light alloy piston designed in accordance with the invention the stresses which are due to the ignition pressure are distinctly lower than in a light-alloy piston having a convention design.

| Location of points where the pressure-induced stresses were measured | Stresses in $N/mm^2$ Design | | |
|---|---|---|---|
| | Light-alloy piston I | Light-alloy piston II | Light-alloy piston III |
| Inner portion of support | −104 | −96 | −92 |
| Rim of recess at valve pocket, parallel to piston axis | +58 | +47 | +41 |
| Rim of recess, unweakened, parallel to piston pin axis | +49 | +39 | +35 |
| Rim of recess, unweakened, at right angles to piston pin axis | −22 | −11 | −8 |

The features of the invention result not only in a decrease of the stresses which are due to the ignition pressure but the provision of the blind holes desirably results also in a saving in weight.

What is claimed is:

1. A light alloy piston for internal combustion engines, comprising: a top portion including a piston head formed with a combustion chamber recess and the ring groove portion, a skirt with integrated piston pin bosses having a support and bore means forming at least one blind hole in portions disposed between a lowermost ring groove and a top apex of the bores and extending from an outside peripheral surface of the skirt inwardly on both sides of a plane which contains a piston axis and the direction of the piston pin axis.

2. A light alloy piston according to claim 1, wherein the at least one blind hole is circular in cross-section and has a diameter that is 10 to 150% of the diameter of the bores in the piston pin bosses.

3. A light alloy piston according to claim 1, wherein the at least one blind hole has in cross-section the configuration of a slot which has a largest diameter that is parallel to the horizontal plane which includes the direction of the piston pin axis.

4. A light-alloy piston according to claim 3, wherein the largest diameter of the slot-shaped at least one blind hole has a length of 30 to 150% of the diameter of the bores in the piston pin bosses and the smallest diameter of the slot-shaped blind hole is larger than three times the height of the ring groove for an oil scraper ring.

5. A light-alloy piston according to claim 3, wherein the cross-section of the at least one blind hole has the configuration of an ellipse.

6. A light-alloy piston according to claim 3, wherein the cross-section of the at least one blind-hole has the configuration of an elongate hole.

7. A light alloy piston according to claim 6, wherein the elongate hole consists of two isosceles legs, which include an obtuse angle on the side facing the skirt.

8. A light-alloy piston according to claim 7, wherein each section of the elongate hole includes an angle of 5° to 25° with the plane that is at right angles to the plane which contains the piston axis and the direction of the piston pin axis.

9. A light-alloy piston according to claim 1, comprising a plurality of parallel cylindrical blind holes and having a common envelope having the configuration of a slot.

10. A light-alloy piston according to claim 1 or 9, wherein each blind hole extends throughout a middle portion of that length portion of the bores in the piston pin bosses in which a piston pin is supported in said bores.

11. A light-alloy piston according to claim 10, wherein each blind hole is symmetrical to the plane which contains the piston axis and the direction of the piston pin axis and at right angles to the plane which contains the piston pin and the direction that is at right angles to the direction of the piston pin axis.

12. A piston according to claim 11, wherein each blind hole communicates through an aperture with the bores in the piston pin bosses in those portions which are opposite to the top apex of said bores in the piston pin bosses.

13. A light alloy piston according to claim 1, wherein the at least one blind hole is circular in cross-section and has a diameter that is 10 to 75% of the diameter of the bores in the piston pin bosses.

14. A light-alloy piston according to claim 3, wherein the largest diameter of the slot-shaped at least one blind hole has a length of 50 to 120% of the diameter of the bores in the piston pin bosses and the smallest diameter of the slot-shaped blind hole is larger than three times the height of the ring groove for an oil scraper ring.

* * * * *